United States Patent [19]
Hayton et al.

[11] Patent Number: 6,140,935
[45] Date of Patent: Oct. 31, 2000

[54] AUDIO DEVICE SECURITY SYSTEM

[75] Inventors: Keith Andrew Hayton, Stratford St Mary; Robert John Burnham, Wickford, both of United Kingdom; Guenter Dorner, Pulheim Geyen, Germany; Thomas Lee Kopicki, Billericay, United Kingdom; Alan Peter Norton, Romford, United Kingdom; Douglas Ralph Sendelbach, Hutton Mount, United Kingdom; Paul Vinzenz Felten, Elsdorf; Werner Loebach, Eitorf, both of Germany

[73] Assignee: Ford Global Technologies, Inc., Dearborn, Mich.

[21] Appl. No.: 08/725,724

[22] Filed: Oct. 4, 1996

[30] Foreign Application Priority Data

Oct. 6, 1995 [GB] United Kingdom .................... 9520428

[51] Int. Cl.[7] ...................................................... G06F 7/04
[52] U.S. Cl. ............................... 340/825.31; 340/825.32; 340/10.1; 340/568.1; 340/568.2; 340/568.3; 340/426
[58] Field of Search ......................... 340/825.31, 825.32, 340/825.54, 568.1, 568.2, 568.3, 10.1, 426

[56] References Cited

U.S. PATENT DOCUMENTS

| 4,494,114 | 1/1985 | Kaish ................................. 340/825.31 |
| 4,720,700 | 1/1988 | Seibold et al. ..................... 340/825.31 |
| 4,808,981 | 2/1989 | Seibold .............................. 340/568.1 |
| 5,552,789 | 9/1996 | Schuermann ....................... 340/825.31 |

*Primary Examiner*—Brian Zimmerman
*Assistant Examiner*—Yves DaLencourt
*Attorney, Agent, or Firm*—Mark Mollon

[57] ABSTRACT

An audio device 1 is installed in a motor vehicle with a vehicle security system 2, 3, 4. The radio 1 has circuitry 21 to detect a connection to the vehicle power supply, a microprocessor 11 to inhibit the operation of the radio after an interruption of the connection, an interface 6 and a connection to a bus 9, 10 for communicating data between the radio 1 and the vehicle security system 2, 3, 4, and a data verification unit 15 with a non-volatile memory 13 for verifying data communicated to the radio. Following an interruption of the connection the radio is automatically reset to operational if the data are communicated and verified, and if the data are not communicated or not verified the radio may only be reset manually.

15 Claims, 3 Drawing Sheets

AUDIO DEVICE SECURITY SYSTEM

BACKGROUND OF THE INVENTION

The invention relates to an audio device and an audio device security system for installation in a motor vehicle.

An audio device such as a radio in a motor vehicle is prone to theft, and several ways have therefore been developed to deter thieves. In the "keycode" system, a radio has a secure non-volatile memory which stores a fixed but randomly selected four digit "keycode". If the power from the vehicle battery is interrupted, even momentarily, a circuit in the radio detects this event and the radio will not permit full operation until the correct four digit keycode has been entered on a keypad on the face of the radio. Since the radio cannot readily be stolen without interrupting the power, the keycode system deters theft.

One problem with the keycode system is that the power to the radio may be lost for other reasons, for example if the battery becomes discharged or is changed. If the vehicle owner cannot recall or find a record of the radio keycode number, then the owner has to contact the vehicle manufacturer to find out the code. This is inconvenient for the user and expensive for the motor vehicle manufacturer.

SUMMARY OF THE INVENTION

According to the invention, there is provided an audio device for installation in a motor vehicle that has a motor vehicle security system, the audio device comprising detection means to detect a connection between the audio device and the vehicle, inhibition means to inhibit at least partly the operation of the audio device after an interruption of the connection, communication means for communicating data between the audio device and the vehicle security system, verification means for verifying data communicated through the communication means and both manual and automatic reset means to reset the operation of the audio device, the device being arranged so that following an interruption of the connection the audio device is automatically reset to operational if the data are communicated and verified, and if the data are not communicated or not verified the audio device may only be reset manually.

Also according to the invention, there is provided an audio device security system for a motor vehicle, comprising an audio device and a vehicle security system, in which the audio device security system has detection means to detect a connection between the audio device and the vehicle, inhibition means to inhibit at least partly the operation of the audio device after an interruption of the connection, communication means for communicating data between the audio device and the vehicle security system, verification means for verifying data communicated through the communication means and both manual and automatic reset means to reset the operation of the audio device, the audio device security system being arranged so that following an interruption of the connection the audio device is automatically reset to operational if the data are communicated and verified, and if the data are not communicated or not verified the audio device may only be reset manually.

The audio device will, of course, most generally be a radio or a radio-cassette player, but it could be another audio device such as a compact disc player, graphic equalizer or mobile telephone.

The connection is preferably an electrical connection, although other types of connection may be monitored by the detection means, such as a physical connection, for example by means of an electrical switch or an optical device. The electrical connection monitored by the detection means is preferably a connection of the audio device to an electrical power supply of the vehicle. However, other types of electrical connection may be monitored by the detection means, such as a connection between the audio device and the vehicle security system.

The detection means may also detect an initial connection of the audio device, for example a connection of the audio device to the vehicle electrical supply when the audio device is installed in a motor vehicle for the very first time.

Although the detection means will normally detect any interruption of the connection upon resumption of the connection, other functions such as the those provided by the verification means or inhibition means need only be activated once the audio device is powered on.

Preferably, the verification means will have a nonvolatile electronic memory, which may comprise hard-wired or programmable memory. The non-volatile memory may hold fixed data, or the data held may vary, for example comprising or relating to at least some of the data communicated when the data is verified. Since the data communicated may be encoded to ensure secure transmission of data, the data communicated may of course be encoded or processed prior to storage of communicated data in the non-volatile memory.

The verification means may then use either fixed or variable stored data, or a combination thereof, to verify subsequent data communicated from the vehicle security system to the audio device.

In a preferred embodiment of the invention, the nonvolatile memory holds an initialization code which is set to indicate either that the audio device has never been powered up in a vehicle, or that it has been powered up at least once. When the audio device is then powered up for the first time and data has been communicated but not verified, the initialization code is used to override the manual resetting so that the audio device is automatically reset. This is done so that a brand new audio device when installed in a vehicle, for example on a production line, will automatically initialize itself to data received from the vehicle security system, even if the standard verification process does not recognize the data communicated as verified, for example by reference to data stored in the non-volatile memory. The non-volatile memory may then store at least some of the data that has been communicated but not verified, so that following a subsequent interruption of the connection, the audio device may automatically reset itself.

It is advantageous if, following an interruption of the connection and manual resetting of the audio device, data communicated but not verified is stored in the nonvolatile memory so that automatic resetting of the audio device may follow the next interruption of the connection. Therefore, the audio device may be removed from one motor vehicle and installed in another vehicle, whereupon once the audio device is reset manually, it will initialize itself to the vehicle security system of the new vehicle so that the audio device may be reset automatically following any subsequent interruption of the connection.

The verification means may involve comparing data received from the vehicle security system with data stored in the non-volatile memory, or alternatively stored data may be communicated from the audio device to the vehicle security system for processing by the vehicle security system prior to communicating data to the audio device.

The data communicated may relate to the identity of the audio device, the motor vehicle, or the operator of the vehicle. For example, the audio device may have an identity such as a serial number, the vehicle may have an identity such as a chassis number, and a key which activates and deactivates the security system may have an identity if the key is personal to an authorized operator of the vehicle.

Therefore, in general at least some of the data which is communicated may relate to the identity of the audio device, vehicle or operator of the vehicle, and any of these identities may comprise a unique identification number or code.

The term "key" includes any device for activating or deactivating the vehicle security system and may be, for example, a hand held infra-red transmitter, a memory card, a passive radio-transmission card or fob, or a conventional key for use in a lock. The key may be an ignition key for the vehicle.

Data communicated from the vehicle security system to the audio device may relate to initial settings for the operation of the audio device. For example, initial settings for a radio would comprise a set of pre-selected bands and frequencies, and volume, tone or balance settings. Then, if the identity of the operator is determined by a key which is personal to the operator, the initial settings for the audio device may be personalized to the preferences of the operator by data communicated from the vehicle security system to the audio device.

However, if there is no such personalization function, it is preferred if no data is communicated unless the inhibition means has been activated to inhibit the operation of the audio device. Then, unless the power or other connection has been interrupted, there will be no interaction between the audio device and the vehicle security system.

It is advantageous if the audio device has means to detect the correct functioning of the vehicle security system. This may occur if the audio device is installed in a vehicle which has no vehicle security system, or a system which is either faulty or incompatible with the audio device. Then, if no data or invalid data is received from the communication means the audio device may still be reset manually. Such an audio device is therefore not restricted to use in vehicle with a vehicle security system compatible with the audio device.

In general, the audio device will have a key pad and the operation of the audio device may be reset manually by keying a code into the audio device, for example a four digit code number. However, the audio device may be reset manually by other means, for example, by inserting a memory card into the audio device, or by wireless transmission of a signal such as an infra-red, radio or ultrasound signal.

The vehicle security system may comprise a security key, which may be an ignition key, with a first transceiver, a second transceiver for wireless communication with the first transceiver, and a security control module in communication with both the second transceiver and the audio device.

The security control module may receive data from the security key via the second transceiver, in order to verify the data from the security key prior to data being communicated through the communication means between the audio device and the vehicle security system. There may therefore be two stages of verification, a first stage being verification by the security control module that the security key is valid, and if it is valid, a second stage in which the audio device verifies that the vehicle security system and/or the security key is valid.

DETAILED DESCRIPTION OF PREFERRED EMBODIMENTS

Figure 1:
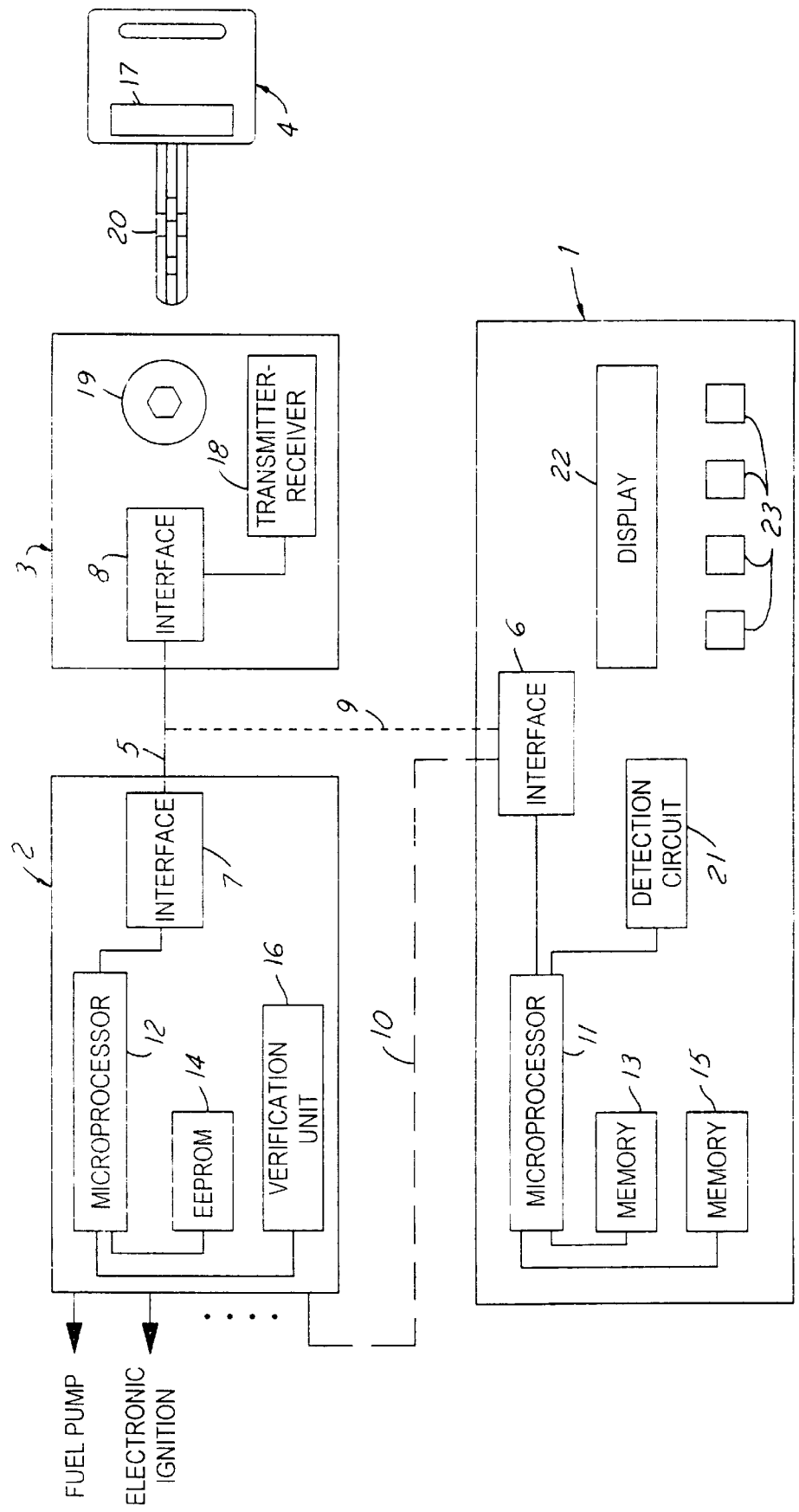
FIG. 1 is a schematic block diagram of an audio device and an audio device security system showing connections between the audio device and a vehicle security system according to a first and second embodiments of the invention.

The main components of the audio device security system shown in FIG. 1 are an audio device 1, which is a radio, a vehicle security controller 2, a key transceiver module 3 and a security ignition key 4. Together, controller 2, transceiver module 3 and key 4 comprise a vehicle security system, which together with radio 1 comprises a radio security system. The operation of the vehicle security system 2, 3, 4 in the absence of radio 1, will be described first.

Controller 2 and transceiver module 3 each have a communications interface 7, 8 between which runs a security system bus 5, for example a two wire bus conforming to the ISO 9141 standard.

Controller interface 7 is connected to a microprocessor 12 which is itself connected to at least one non-volatile memory 14 such as an EEPROM, and a data verification unit 16. Data verification unit 16 may consist of discrete chips, or alternatively may be built into or programmed into the functioning of microprocessor 12.

Ignition key 4 also has a transceiver, referred to herein as a transponder 17. The internal components of transponder 17 are not illustrated, but comprise a radio-frequency receiving-transmitting antenna, power storage capacitor, and a CMOS ASIC programmed with a security algorithm, all encapsulated within a glass cylinder.

Transceiver module 3 has a radio-frequency (rf) transmitter-receiver 18 in proximity with a lock mechanism 19. The shaft 20 of the key is inserted into lock 19 and turned to one of the three standard positions: accessory, run or start. The key may or may not be cut to operate a tumbler mechanism within the lock, but in either case, as soon as the key is turned to or past the run position, controller 2 activates transceiver module 3 through security bus 5.

The transceiver module's rf transmitter-receiver generates an rf field of 134.2 kHz for about 50 ms, which is received by transponder 17 to charge the storage capacitor. The energy so received is used to generate a 64 bit security code plus bits containing a cyclic redundancy check (CRC) which is transmitted serially back to transceiver 18 using frequency modulation at 134.2 kHz and 123.2 kHz.

Transceiver module 3 transmits the security code serially down bus 5 to security controller 2. Microprocessor 12 then verifies first that the data is valid using the cyclic redundancy check, and then that the data corresponds with data stored in non-volatile memory 16. If the data is verified, then controller 2 sends an enable signal or otherwise activates essential motor vehicle components, such as a fuel pump, electronic ignition, or electronic engine management.

Each key 4 may produce a unique security code, although in one implementation of the vehicle security system, a master key may be used to program new keys which may have either a common or a different security code.

A vehicle security system 2, 3, 4 as described above is known and has been implemented by Ford Motor Company as the "passive anti-theft system" (PATS) for vehicle immobilization.

FIG. 1 illustrates two alternative embodiments of the radio security system. In the first embodiment, a bus 9 is connected between a radio communications interface 6 and security system bus 5. In a second embodiment, radio communications interface 6 is connected to an output of security controller 2 via a bus or signal line 10.

Radio interface 6 is connected to a microprocessor 11 which is itself connected to at least one non-volatile memory 13 such as an EEPROM, and a data verification unit 15. Radio data verification unit 15 may consist of discrete chips, or alternatively may be built into or programmed into the functioning of radio microprocessor 11.

In the first embodiment, radio 1 interacts directly with transponder 4 after the initial communication between the controller 2 and transceiver module 3 has been completed. The radio activates transceiver module 3 in the same manner as described above for the controller, and then similarly verifies both the cyclic redundancy check and the content of the data with data stored previously in the radio non-volatile memory 15. If the data is verified as being valid and previously stored, then the radio is activated. Of course, radio 1 is not essential to the operation of the motor vehicle, and so there is no need for the radio to verify the data every time the vehicle is started. However, since radio 1 may be stolen and removed from the vehicle, the radio has a detection circuit 21, connected to the radio microprocessor 11, which detects even a momentary interruption in the supply to the radio.

If detection circuit 21 is activated, then the next time radio 1 is powered on radio microprocessor 11 will, according to the first embodiment, inhibit the full operation of the radio and initiate the verification sequence directly with transceiver module 3 via radio interface 6 or alternatively, according to the second embodiment, either the radio or controller microprocessors 11, 12 may communicate following verification by the controller 2, and this may be by the transmission by the controller of an activation code to the radio.

In either embodiment, the security code is compared by a microprocessor with a code stored in a non-volatile memory. The comparison may simply be a comparison for an identity between the security code and the stored code or it may involve additional processing by a verification unit. This latter option may permit the security code to be encrypted according to well-known techniques before transmission by the transponder 4 or transceiver module 3. The encryption could be by a secure algorithm which uses a pseudo-random code transmitted to the transponder or transceiver module, so that a different security code would be produced every time the transponder 4 is activated. The verification means would then use a 'key' to decipher the encrypted security code. Similarly, secure encrypted communication could be extended to bus 10 between the radio 1 and controller 2.

Radio 1 also comprises means for resetting the operation of the radio manually after a supply interruption, with these manual reset means coming into operation if the automatic reset means described above fails for any reason. Radio 1 may then be installed in a vehicle without a compatible vehicle security system. These manual means may operate in the same manner as known systems, for example the "keycode" system in which the radio is reset following a prompt on a radio display 22 to enter a sequence of digits (the keycode) on a radio keypad 23. If the correct keycode is not entered after, say, three tries, then the radio becomes locked out for an extended period, for example thirty minutes, before a new attempt to reset the radio manually may be made.

Figure 2:
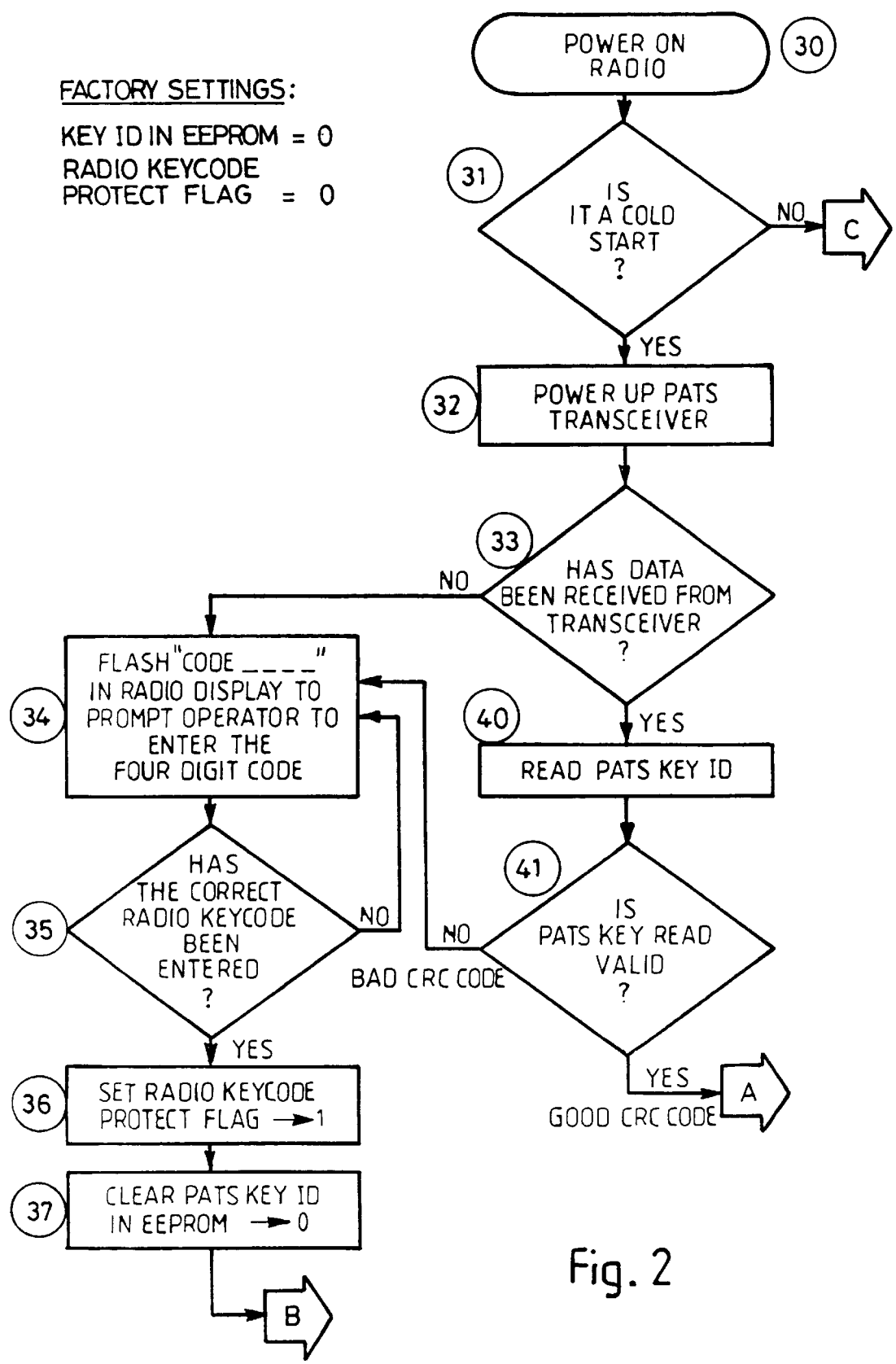
FIGS. 2 and 3 show a flow diagram for the audio device and audio device security system according to the first embodiment of the invention.
Figure 3:
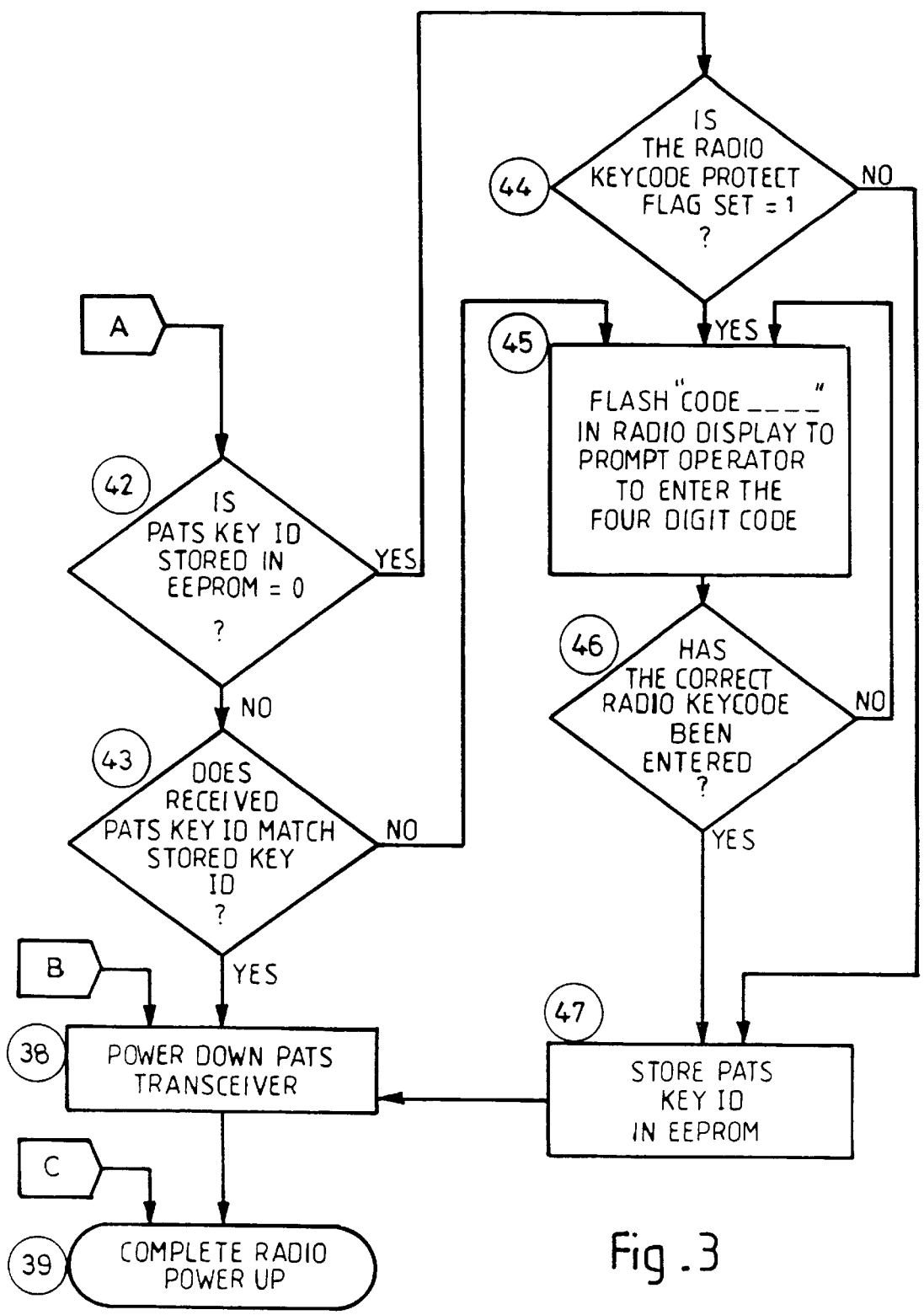

FIGS. 2 and 3 are flow diagrams for the first embodiment of the invention, showing the main steps involved in the verification process including the communication between radio 1 and transceiver module 3, which is part of a PATS vehicle immobilizer. After radio 1 is powered on at step 30, full operation of the radio is temporarily inhibited during the PATS verification process. Radio 1 does not exchange data via bus 9 with vehicle security controller 2, but waits for a predetermined time after which any communication between controller 2 and transceiver module 3 will have been completed.

During this interval, radio microprocessor 11 checks with supply interruption detection circuit 21 in step 31 to find out if the power supply has been interrupted; that is, if there has been a "cold start". If there has not been, then the radio powers up normally in step 39 and becomes fully functional, without having communicated with the vehicle security system.

If the power has been interrupted, then this means one of several things: the vehicle battery may have been discharged or changed, in which case the operation should be inhibited prior to resetting, preferably automatically; or that the radio has been stolen or legitimately moved to another vehicle, in which case the operation of the radio should be inhibited unless it is reset manually; or that the radio has been installed for the very first time in a vehicle (e.g. on the vehicle production line), in which case the radio should be reset, preferably automatically.

As indicated in FIG. 2, the radio is manufactured with a variable "key ID" and "radio keycode protect flag" in the radio non-volatile memory 13 both pre-programmed to zero. Both variables remain zero only until the radio is powered up for the first time and so taken together, the key ID and radio keycode protect flag provide an initialization code. On its own, the key ID is a unique identification number that represents the identity of a PATS ignition key used to operate the vehicle. No PATS keys have the identification number zero.

Whenever a radio is installed in a vehicle on a production line, the correct functioning of the radio and sound system to which it is connected needs to be checked. It is inconvenient, and also poor for security, if production workers have to be given and then enter the correct keycode to reset the radio manually. FIGS. 2 and 3 show how this problem is overcome.

When powered on, the radio will detect if there has been a cold start, and if so will attempt to power up the PATS transceiver module in step 32. The radio may have been installed in a car which has either no PATS system, or which has a fault in the PATS system, and so it is necessary first to check if data has been received from the transceiver module in step 33. The check may simply involve a pause for a predetermined time until the PATS key ID has been read in step 40, after which if nothing has been received the radio will default to the manual keycode reset process in steps 34 and 35.

If data has been read, then it is necessary next to check if the data is valid in step 41, and this is conveniently done by validating the cyclic redundancy check (CRC code). If the data is invalid, then again the radio must be reset using the manual keycode route of steps 34 and 35.

If the data is valid, then the radio checks in step 42 whether the stored PATS key ID in EEPROM is zero, which will initially be the case, whereupon the radio next checks if the keycode protect flag is equal to one in step 44. Since in this example, the keycode protect flag is also zero, the radio recognizes that it has been installed on the production line. The radio stores the PATS key ID in EEPROM in step 47, powers down the transceiver module in step 38 and completes the power up of the radio in step 39. The radio will therefore have been automatically reset.

After any subsequent interruption of power, the radio will recognize the same PATS key ID in step 43 and will proceed to complete the radio power up in steps 38 and 39.

Returning to the case where data is not read in step 33 (for example, if the radio is moved to a vehicle which does not have the PATS system, or if communication to the PATS systems fails for any reason), then the manual keycode sequence of steps 34 and 35 will be used. If the correct keycode is entered the radio keycode protect flag will then be set to one in step 36, and the PATS "key ID" set to zero in step 37. Then the radio is completely powered up in steps 38 and 39.

If, following a subsequent cold start, the radio regains contact with the PATS system because the fault has been repaired, or because the radio has been moved to a vehicle with the PATS system, the radio will recognize that the PATS key ID is equal to one in step 42, and that the keycode protect flag is equal to zero in step 44. It then waits for a manual keycode reset in steps 45 and 46, before storing the PATS key ID in EEPROM in step 47, and completing the radio power up in steps 38 and 39.

When the radio is installed with a vehicle security system according to the second embodiment of the invention, the main conceptual steps of FIGS. 2 and 3 are unchanged. However, unlike transceiver module 3, the vehicle security controller 2 does much more than just relay data. Differences could therefore stem from the ability of the controller to verify data before passing a verification code or signal to the radio, and for more sophisticated communications between controller 2 and radio 1.

For example, a PATS controller could determine which one of a number of valid PATS keys had been used to operate the vehicle, and then pass a customization code to the radio, so that the radio is powered up with a particular operator's preferred radio station and audio settings.

In the second embodiment, a PATS controller could also perform an initial verification of the PATS key ID, before communicating in a secure manner with the radio. One known way in which secure communications can be performed is by encrypting data with a "key", such as a large number which is itself the product of two large prime numbers. Upon reception, the key is used to decipher the data. The key may be held in a non-volatile memory such as an EEPROM, or any other type of non-volatile memory, including hard-wired circuitry in an integrated circuit such as an ASIC.

Of course, the same verification data would be transmitted more than once from the controller to the radio. According to well-known techniques, it would therefore be necessary to transmit some additional encrypted data, not relating to the PATS key ID itself, between the radio and controller, so that the encrypted verification signal received by the radio could not be predicted from previous verification signals.

Those skilled in the art will recognize that there are many other ways to implement the communications between the radio and the vehicle security system. The data communicated may be coded digitally or be contained in a modulated analog signal. Communication may be only from the vehicle security system to the radio, rather than in both directions.

The division of verification means between the radio and the vehicle security system may also vary from the specific embodiment described above, with the radio having a greater or lesser role in the verification process.

The degree of integration between the radio and the vehicle security system may also be higher than the examples described. The vehicle security system, of course, needs to built into a secure portion of the vehicle body to help prevent tampering with or by-passing of the system. It may therefore be advantageous if at least portions of the radio electronics are combined with the vehicle security system with, perhaps, the more accessible front panel of the radio comprising a display and keypad.

A radio or other vehicle audio device according to the invention will provide a high degree of security when used with a vehicle security system. Both the vehicle manufacturer and user of the vehicle will benefit from the convenience of automatic resetting of the radio, with manual resetting continuing to be an option if the link to the vehicle security system fails, or if the radio is installed in a vehicle without an appropriate vehicle security system.

What is claimed is:

1. An audio device for installation in a motor vehicle including an electronic security system responsive to an electronic security code for operating said vehicle, said audio device comprising:

detection means to detect a connection between said audio device and said vehicle;

inhibition means to inhibit at least partly the operation of said audio device after an interruption of said connection;

communication means for communicating data between said audio device and said electronic security system;

verification means for verifying data communicated through said communication means in response to said electronic security code;

automatic reset means to uninhibit operation of said audio device following an interruption of said connection if said data are communicated and verified; and manual reset means to uninhibit operation of said audio device following an interruption of said connection if said data are not communicated or not verified but a predetermined code stored in said audio device is entered manually.

2. The audio device of claim 1 wherein said connection is an electrical connection.

3. The audio device of claim 2 wherein said electrical connection is to an electrical power supply of said vehicle.

4. The audio device of claim 1 wherein said detection means further detects a first-time installation of said audio device to said vehicle.

5. The audio device of claim 1 wherein said verification means is activated in response to said audio device being connected to an electrical power supply.

6. The audio device of claim 1 wherein said verification means has a non-volatile memory for storing data.

7. The audio device of claim 6 wherein said non-volatile memory stores at least some of said data communicated after said data is verified.

8. The audio device of claim 6 wherein said verification means compares stored data with data communicated from said electronic security system to said audio device.

9. The audio device of claim 6 wherein said non-volatile memory holds an initialization code which is set to indicate either that said audio device has never been powered up in a vehicle, or that it has been powered up at least once, so that when said audio device is powered up for said first time and data has been communicated but not verified, said initialization code is used to override said manual resetting so that said audio device is automatically reset.

10. The audio device of claim 6 wherein following an interruption of said connection and manual resetting of said audio device, said data which is communicated but not verified is stored in said non-volatile memory so that automatic resetting of said audio device may follow a subsequent interruption of said connection in response to said same data.

11. The audio device of claim 1 wherein said vehicle is activated by a key which has an identity and wherein at least some of said electronic security code relates to said identity of said key.

12. The audio device of claim 1 wherein no data is communicated unless said inhibition means has been activated to inhibit said operation of said audio device.

13. The audio device of claim 1 wherein said audio device has a key pad and said operation of said audio device is reset manually by keying said predetermined code on said key pad.

14. An audio device security system for a motor vehicle comprising:

an electronic security system responsive to an electronic security code for operating said vehicle; and an audio device including:
   detection means to detect a connection between said audio device and said vehicle;
   inhibition means to inhibit at least partly the operation of said audio device after an interruption of said connection;
   communication means for communicating data between said audio device and said electronic security system;
   verification means for verifying data communicated through said communication means in response to said electronic security code;
   automatic reset means to uninhibit operation of said audio device following an interruption of said connection if said data are communicated and verified; and
   manual reset means to uninhibit operation of said audio device following an interruption of said connection if said data are not communicated or not verified but a predetermined code stored in said audio device is entered manually.

15. The audio device security system of claim 14 wherein said electronic security system comprises:

a security key with a first transceiver for transmitting said electronic security code;

a second transceiver installed in said vehicle for wireless communication with said first transceiver; and a security control module in communication with both said second transceiver and said audio device.

* * * * *